(12) United States Patent
Burge

(10) Patent No.: US 7,988,111 B2
(45) Date of Patent: Aug. 2, 2011

(54) MULTIMEDIA DEVICE BRACKET

(75) Inventor: Benjamin D. Burge, Shaker Heights, OH (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 12/912,339

(22) Filed: Oct. 26, 2010

(65) Prior Publication Data

US 2011/0037739 A1    Feb. 17, 2011

Related U.S. Application Data

(62) Division of application No. 12/049,822, filed on Mar. 17, 2008, now Pat. No. 7,845,605.

(51) Int. Cl.
*A47B 96/00* (2006.01)
(52) U.S. Cl. ............................... 248/222.52; 248/220.1
(58) Field of Classification Search ............... 248/276.1, 248/287.1, 913, 911, 918; 361/679.23
See application file for complete search history.

(56) References Cited

U.S. PATENT DOCUMENTS

| | | | |
|---|---|---|---|
| 3,512,605 A | 5/1970 | McCorkle | |
| 5,852,545 A * | 12/1998 | Pan-Ratzlaff | 361/679.23 |
| 6,050,849 A | 4/2000 | Chang | |
| 6,275,375 B1 | 8/2001 | Nam et al. | |
| 7,057,662 B2 | 6/2006 | Malzbender | |
| 7,061,754 B2 | 6/2006 | Moscovitch | |
| 7,145,767 B2 | 12/2006 | Mache et al. | |
| 7,594,823 B2 | 9/2009 | Moscovitch | |
| 2002/0027613 A1* | 3/2002 | Tajima | 348/552 |
| 2003/0001055 A1 | 1/2003 | Harary et al. | |
| 2003/0015632 A1 | 1/2003 | Dunn et al. | |
| 2003/0156075 A1 | 8/2003 | Motoyama et al. | |
| 2004/0019732 A1 | 1/2004 | Overtoom et al. | |
| 2004/0150945 A1 | 8/2004 | Mache et al. | |
| 2005/0146251 A1 | 7/2005 | Gillengerten | |
| 2009/0230263 A1 | 9/2009 | Burge | |

FOREIGN PATENT DOCUMENTS

FR        2536644 A1     6/1984

OTHER PUBLICATIONS

Ergotron, Inc. product guide; Change the way you view the world, Flat panel monitor, notebook, tablet PC and LCD TV mounting and mobility products; vol. 4, No. 2, Sep. 17, 2008.
Ergotron, Inc. product guide; Adjustable Office Display Mounts, Increase Comfort and Productivity, Jul. 31, 2007.

(Continued)

*Primary Examiner* — Amy J Sterling
*Assistant Examiner* — Erin Smith

(57) ABSTRACT

An apparatus and method for mounting various audio devices to a flat panel display employing mounting holes disposed on a rearward face of the panel of the flat panel display that are otherwise normally employed to couple a support of the flat panel display to the panel of the flat panel display, wherein a hub supporting rods that in turn support the audio devices is coupled to the rearward face of the panel with the aid of those holes, and wherein the hub and rods together convey electrical signals between at least one of the audio devices and at least one cable.

4 Claims, 18 Drawing Sheets

OTHER PUBLICATIONS

9X Media Product Overview; Expand Your Vision, The World's Most Advanced Multi-Screen Solutions, CA, USA, Copyright 2001-2004.

9X Media Product Overview; Expand Your Vision, Video Wall Installations, CA, USA. Retrieved from www.9Xmedia.com, Sep. 22, 2008.

PoweredUSB.org, An Informational Web Site; Retail USB, USB PlusPower, USB +Power; Electro-Mechanocal Specification Version 0.8, Powered USB Electro/Mechanical, 2005.

Vantage Point Products Corporation; About VESA Standard, VESA Mount for LCD Monitors, LCD Displays and Plasma Screens. Retrieved from www.vanptc.com, Sep. 22, 2008.

International Search Report and Written Opinion dated Jun. 29, 2009 for PCT/US2009037241.

International Preliminary Report on Patentability dated Oct. 28, 2010 for PCT/US2009/037241.

* cited by examiner

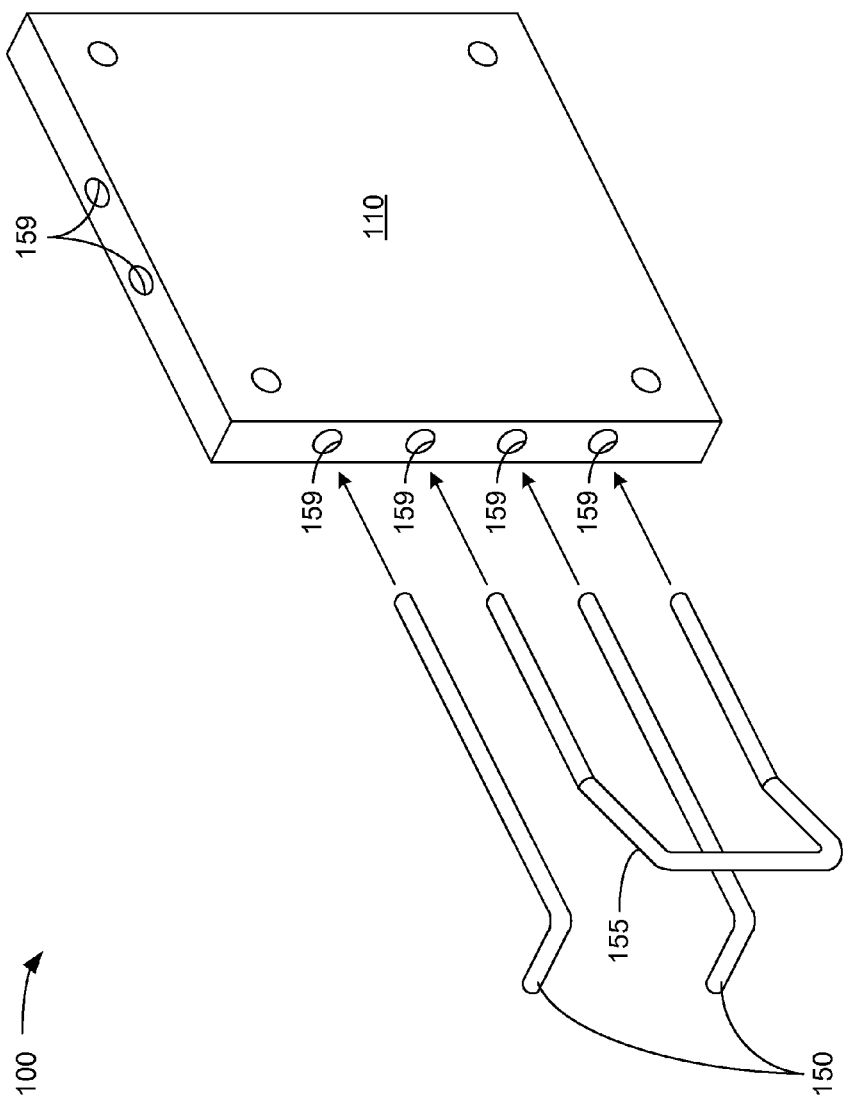

MULTIMEDIA DEVICE BRACKET

CROSS-REFERENCE TO RELATED APPLICATION

This present application is a division of application Ser. No. 12/049,822 filed Mar. 17, 2008 by Benjamin D. Burge, the disclosure of which is incorporated herein by reference.

FIELD OF INVENTION

This disclosure relates to brackets to mount multimedia devices and conceal their cabling.

BACKGROUND

Microphones, speakers, audio controls and other audio devices have been provided with numerous ways in which to be mounted in both residential and commercial settings over many years. As computers have recently acquired more advanced audio capabilities, and as home televisions employing only built-in speakers have recently been supplanted by home entertainment systems incorporating numerous distinct speakers (i.e., speakers that are physically separate from a display) to provide higher quality sound, ever more ways of mounting multimedia devices, especially audio devices, have been devised.

However, with the growing prevalence of flat panel displays in both computer systems and home entertainment systems, the opportunity to provide the visual display function in a more compact and less visually objectionable form has spurred on a desire to implement audio components in ways that are also less visually objectionable. As a result, more compact forms of speakers and other audio components are being created.

In this transition to thinner displays and more compact audio devices, finding ways to conceal the plethora of cables interconnecting these devices has now become a more prominent issue. Before this transition, the sheer size of tube-based and rear-projection televisions and computer displays tended to have the effect of relegating the unsightly nature of numerous cables draped between devices to being a largely insubstantial issue. Indeed, the bulkier cabinetry of these displays was often relied upon to conceal such cables. However, with this present day transition to thinner displays, there is now at least a perceived opportunity to "clean up" the overall appearance of computer and home entertainment installations, and a decreasing willingness to tolerate the unsightly and cluttered appearance of so many cables.

However, although ever greater attention has been given to the design of flat panel displays and compact speakers to increasingly mitigate their visual impact on a home or office interior, solutions for the routing and concealment of cables to achieve the same effect have been somewhat lacking. In particular, the installation of compact speakers and microphones alongside flat panel displays, including flat panel computer displays and flat panel televisions, continues to be accompanied by an unsightly tangle of cabling conveying both power and various audio/visual signals. This is expected to become ever more of an issue as the distinction between computer and entertainment functions becomes ever more blurred, and as still other devices incorporating both audio and visual functionality (e.g., video phone systems) begin to become commonplace. As such convergences of functionality take hold, the tangle of cabling accompanying such devices is only expected to become worse.

SUMMARY

An apparatus and method for mounting various audio devices to a flat panel display employing mounting holes disposed on a rearward face of the panel of the flat panel display that are otherwise normally employed to couple a support of the flat panel display to the panel of the flat panel display, wherein a hub supporting rods that in turn support the audio devices is coupled to the rearward face of the panel with the aid of those holes, and wherein the hub and rods together convey electrical signals between at least one of the audio devices and at least one cable.

In one aspect, a multimedia device bracket comprises a hub having a first face, a second face, an edge extending between the first and second faces, and a first plurality of passages that are formed through and extend between the first and second faces, wherein the first plurality of passages define corners of a rectilinear pattern on the first and second faces, and wherein the first plurality of passages align with corresponding ones of a plurality of holes formed in a face of a panel of a flat panel display; and a plurality of rods, each rod having a first end to couple with the hub, each rod having a second end to couple with an audio device to physically support the audio device at a location alongside an edge of the panel, and each rod having at least one conductive surface capable of engaging an electrical contact of the hub and an electrical contact of the audio device to convey an electrical signal between the hub and the audio device.

Implementations may include, and are not limited to, one or more of the following features. The hub may incorporate a second plurality of passages formed in the edge of the hub into which the first ends of the rods may be inserted, whereupon the first ends of the rods are engaged in a manner that resists movement of the rods within each passage of the second plurality of passages and whereupon an external surface of the first ends of the rods may each engage an electrical contact. One or more of the rods may convey an electrical signal between conductive external surfaces of the first and second ends such that an electrical signal may be conveyed between an electrical contact of the hub and an electrical contact of the audio device. The hub may incorporate a cable connector having at contact that is electrically coupled to an electrical contact of the hub that is able to engage a first end of one of the rods to thereby enable an electrical signal to be conveyed between the audio device and a cable through a rod and the hub. The audio device may be a speaker, a microphone, and/or a manually-operable control.

In one aspect, a method comprises detecting a rotation of a panel of a flat panel display between a landscape mode and a portrait mode; and switching between a first mode and a second mode in response to detecting the rotation, wherein a first audio channel is directed to a first audio device physically supported along a first edge of the panel and a second audio channel is directed to a second audio device physically supported along a second edge of the panel in the first mode, and wherein the first and second audio channels are mixed into one mixed audio channel and the one mixed audio channel is directed to first and second audio devices in the second mode.

Implementations may include, and are no limited to, one or more of the following features. The bracket may be mountable between the panel and a support of the flat panel display, and the bracket may support the first and second audio devices in a manner that enables the first and second audio devices to rotate with the panel between landscape mode and portrait mode. The first and second edges of the panel may be opposing edges of the panel.

Other features and advantages of the invention will be apparent from the description and claims that follow.

BRIEF DESCRIPTION OF THE DRAWINGS

FIG. 1b is rear elevational view of the assembly of FIG. 1a.
FIG. 1c is side elevational view of the assembly of FIG. 1a.
FIG. 1d is an exploded perspective view of the assembly of FIG. 1a.
FIGS. 5b, 5c and 5d are sectional views of still another hub depicted in FIG. 5a.
FIG. 8 is another exploded perspective view of portions of an assembly.

DETAILED DESCRIPTION

It should be noted that although the following discussion employs terminology indicating direction and orientation, including words such as "left," "right," "top," "bottom," "above," "below," "front," "rear," "horizontal" and "vertical," such terminology is merely for clarity of description. Use of such terminology should not be construed as imposing limitations on coverage afforded by what is claimed herein.

Figure 1A:
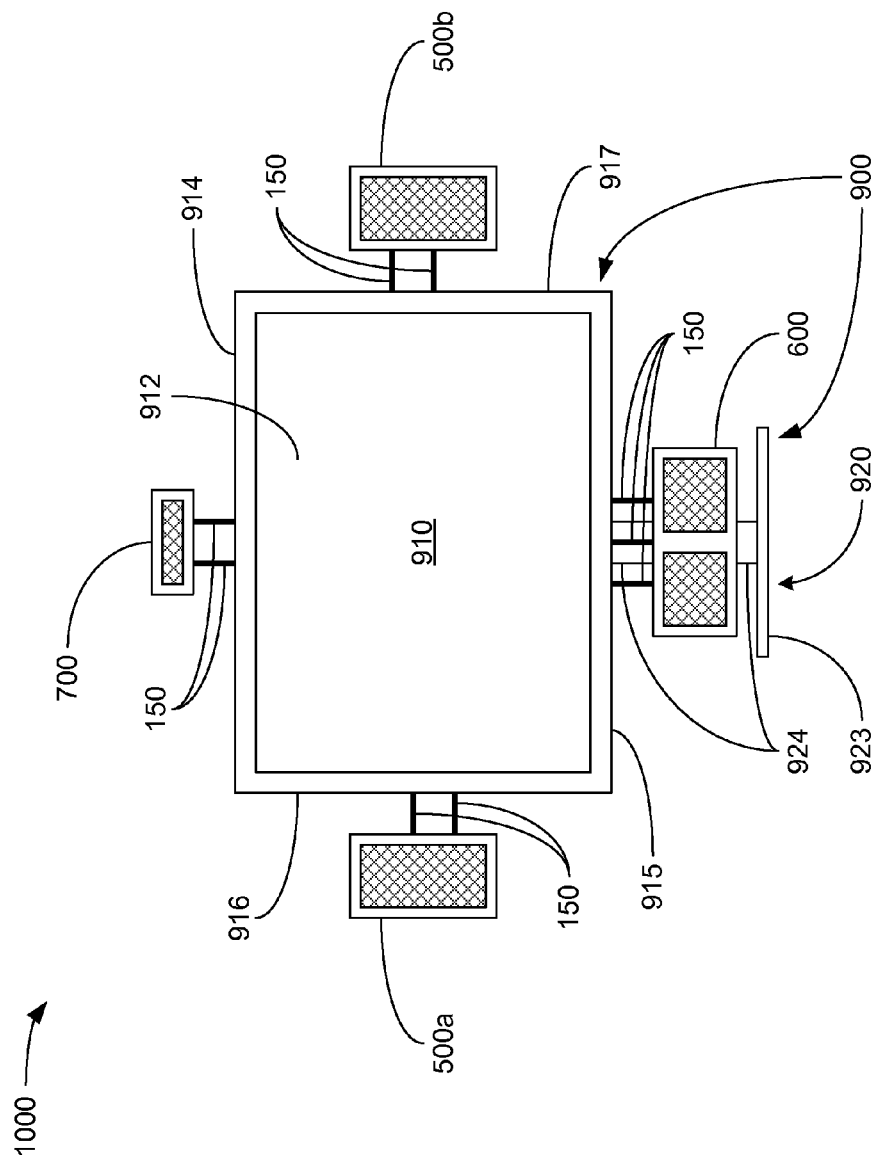
FIG. 1a is front elevational view of an assembly.
Figure 1B:
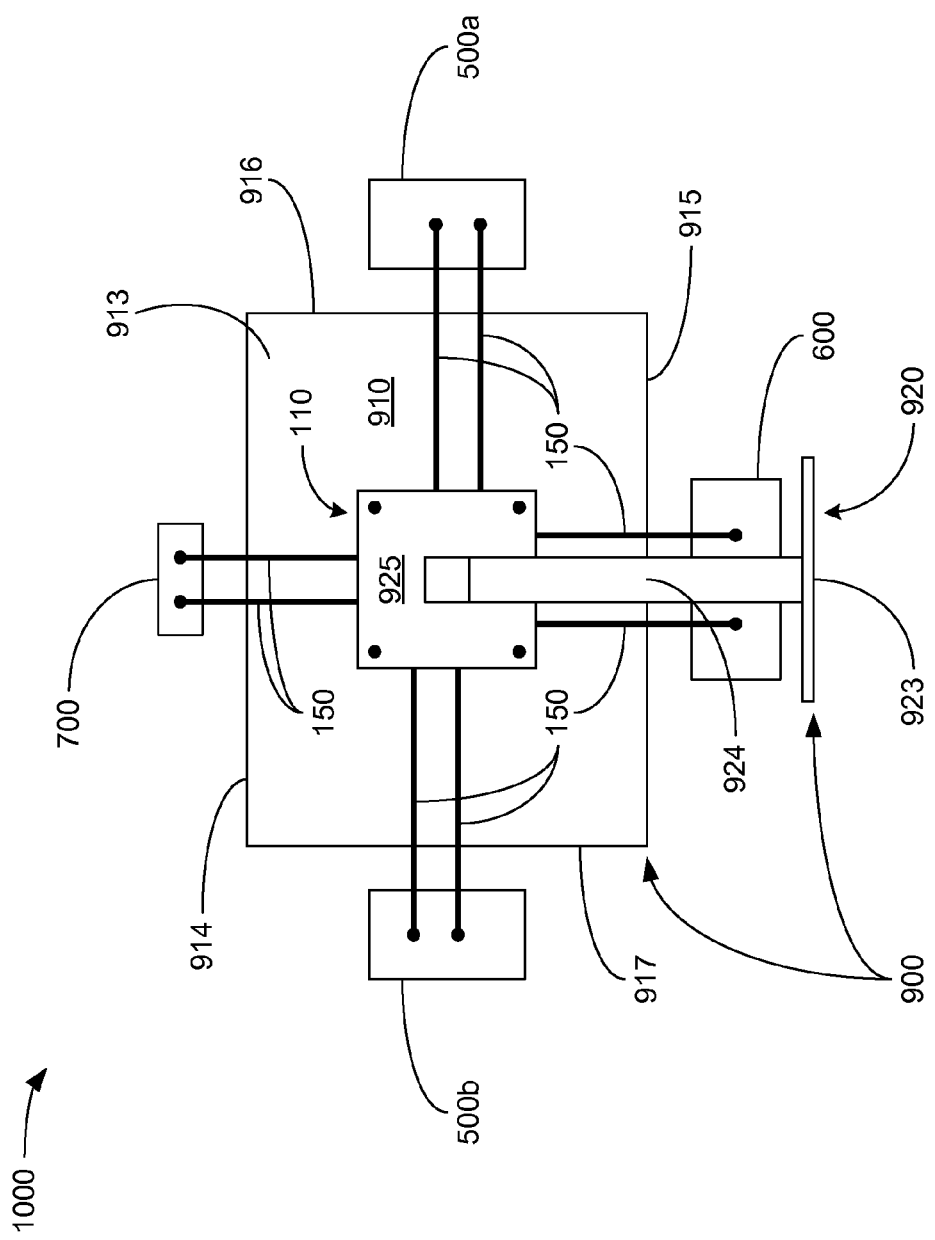
Figure 1C:
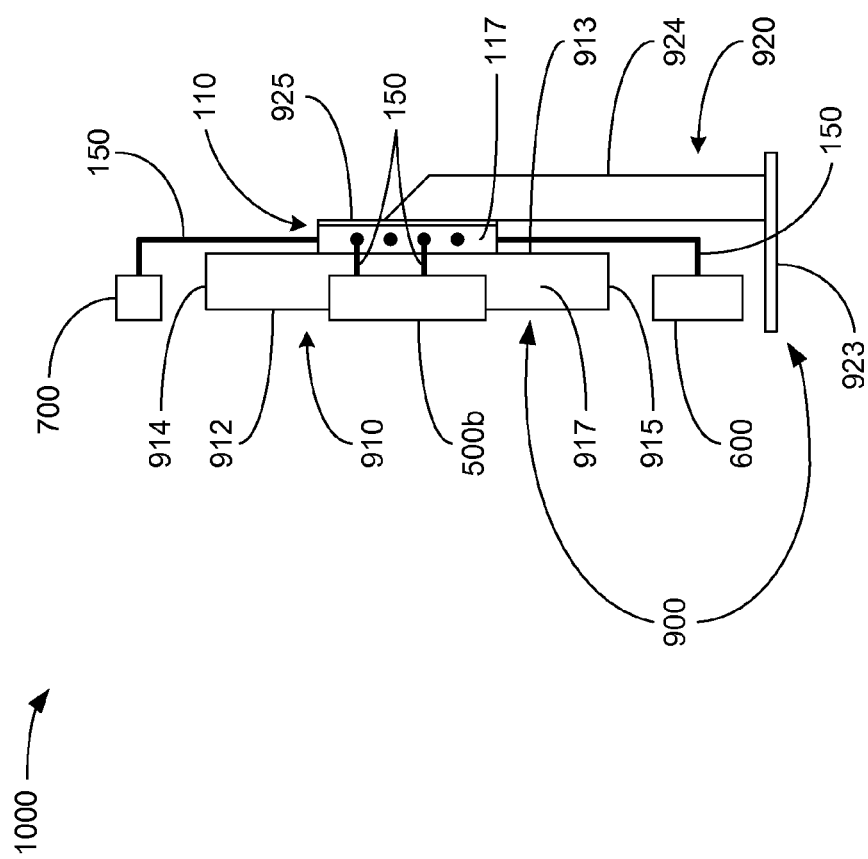
Figure 1D:
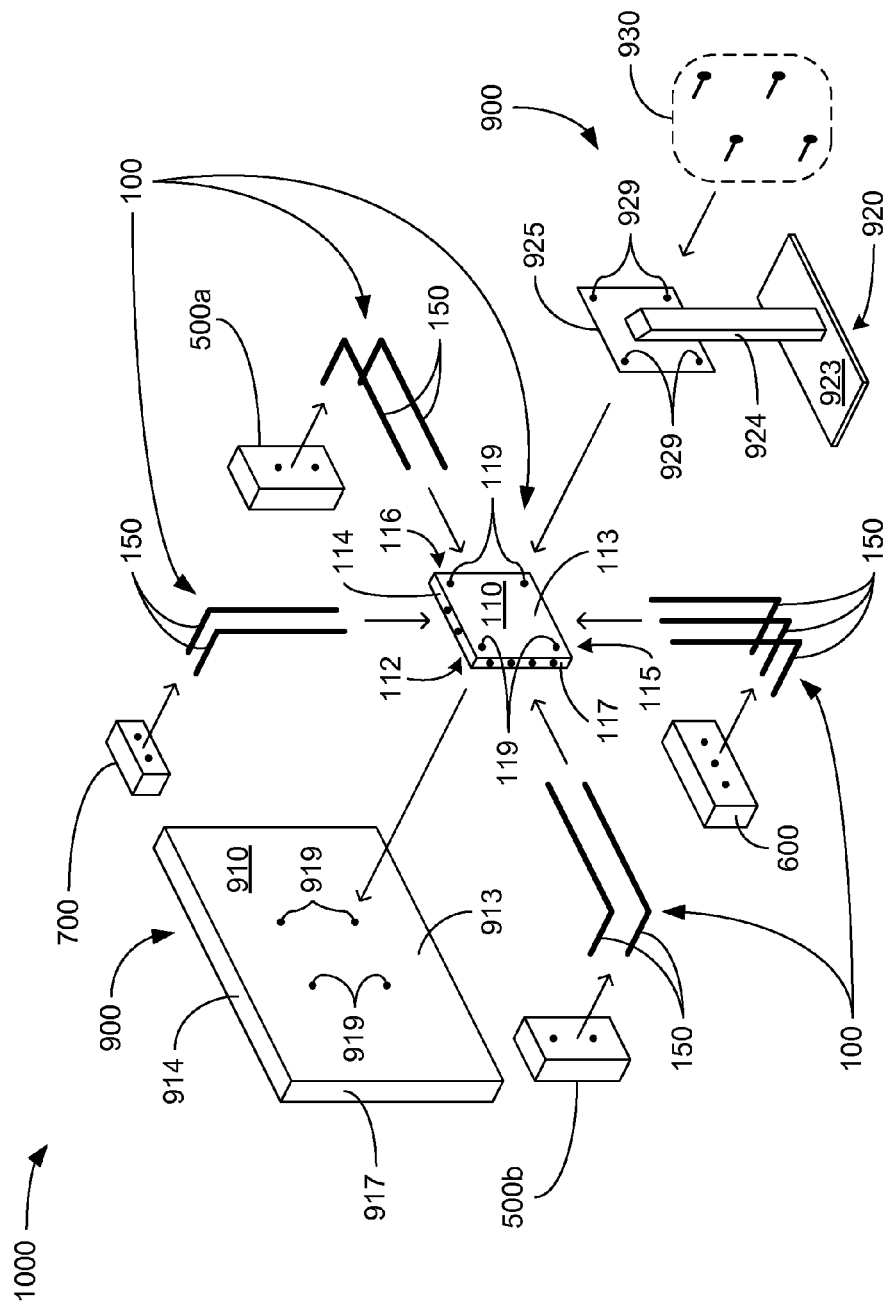

FIGS. 1a, 1b, 1c and 1d, taken together, depict an assembly 1000 of audio and visual devices capable of performing various multimedia functions, and incorporating a form of a bracket 100 to mount one or more audio devices 500a, 500b, 600 and 700 to one form of a flat panel display 900. As will be explained, the bracket 100 is mechanically attached to the flat panel display 900, and conveys electrical signals between one or more of these audio devices and one or more cables conveying power and/or audio signals in support of these audio devices while mitigating the visual impact of those cables. FIGS. 1a-c are front, rear and side elevational views of the assembly 1000 in fully assembled form, and FIG. 1d is an exploded perspective view depicting the manner in which portions of the bracket 100 and the flat panel display 900 are coupled to form the assembly 1000.

The flat panel display 900 may be any of a variety of types of flat panel displays serving any of a variety of purposes. By way of example only, the flat panel display 900 may be based on liquid crystal display (LCD) technology, and may be employed as a display for a computer system (not shown). Also by way of example only, the flat panel display 900 may be based on plasma display technology, and may be employed as a television display for a home entertainment system (not shown). As is best seen in FIGS. 1c and 1d, the flat panel display 900 incorporates a panel 910, a support 920 and mounting hardware 930 commonly employed to attach the panel 910 directly to the support 920. The panel 910 has a front face 912, a rear face 913, a top edge 914, a bottom edge 915, a left edge 916 and a right edge 917. The support 920 incorporates a base plate 923, an arm 924 and a mounting plate 925. As will be explained in greater detail, the mounting hardware 930 is commonly a set of four machine screws that extend through a set of passages 929 formed through the mounting plate 925 and into an aligned set of holes 919 formed in the rear face 913 of the panel 910. As will also be explained in greater detail, the holes 919 are commonly threaded to be engaged by the machine screw threads of the mounting hardware 930. In this way, the mounting plate 925 of the support 920 may be directly coupled to the rear face 913 of the panel 910 where the bracket 100 is not coupled to the flat panel display 900. However, in the assembly 1000, the mounting hardware 930 is further employed to mount the bracket 100 to the flat panel 900, as will be explained in greater detail.

Each of the audio devices 500a, 500b, 600 and 700 may each be any of a variety of types of audio device serving any of a variety of purposes. However, for sake of simplicity of discussion and understanding of depicted embodiments, specific audio functions are attributed to each of the audio devices 500a, 500b, 600 and 700 in the discussion that follows. Specifically, the audio devices 500a and 500b will be discussed as being left and right channel speakers, respectively, and the audio device 700 will be discussed as being a microphone. Further, and depending on implementations to be discussed, the audio device 600 will be variously discussed as being a center channel speaker used in conjunction with the audio devices 500a and 500b, an audio control device used in conjunction with the audio devices 500a and 500b, and a multi-channel speaker providing multiple audio channels (e.g., a combination of left, right and/or center audio channels) as an alternative to the audio devices 500a and 500b.

The bracket 100 is meant to be mounted between the support 920 and the panel 910. The bracket 100 incorporates a hub 110, and a plurality of rods 150 to both mechanically and electrically couple one or more of the audio devices 500a, 500b, 600 and 700 to the hub 110. The hub 110 has a front face 112, a rear face 113, a top edge 114, a bottom edge 115, a left edge 116 and a right edge 117. The hub 110 is preferably mounted in a manner in which the hub is "sandwiched" between the mounting plate 925 of the support 920 and the rear face 913 of the panel 910. When so mounted, the front face 112 of the hub 110 faces (and is preferably in contact with) the rear face 913 of the panel, and rear face 113 of the hub 110 faces (and is preferably in contact with) the mounting plate 925 of the support. The hub 110 has a plurality of passages 119 formed therethrough and extending between the front face 112 and the rear face 113. At least some of the passages 119 are positioned on the front face 112 and rear face 113 to align with the holes 919 of the panel 910 and the passages 929 of the support 920 when the hub 110 is mounted so as to be sandwiched therebetween. These passages 119 have dimensions chosen to allow the mounting hardware 930 to pass therethrough to secure the hub 110 in place between the mounting plate 925 and the rear face 913.

Each of the rods 150 has at least one conductive external surface capable of conducting an electrical signal, and in the depicted form of the bracket 100, each one of the rods 150 is bent to be able reach around from the vicinity of the rear face 913 of the panel 910 to the vicinity of one of the edges 914, 915, 916 and 917 of the panel 910. In this way, the rods 150 may be used to mechanically support each of the audio devices 500a, 500b, 600 and 700 in a manner in which they appear to be "suspended" in place alongside one or more of the edges 914, 915, 916 and 917 of the panel 910 from the perspective of someone viewing the front face 912 of the panel 910. Further, the rods 150 convey electrical signals between the hub 110 and each of the audio devices 500a, 500b, 600 and 700, thereby removing the need for unsightly cables to be connected directly to any of these audio devices.

Instead, and as will be explained in greater detail, such cables are connected to the hub 110. This has the visual effect of leaving the rods 150 as the only physical objects to actually make physical contact with each of the audio devices 500*a*, 500*b*, 600 and 700, thereby providing an uncluttered and pleasant appearance not usually associated with efforts to combine separate display and audio devices. It should be noted that although the rods 150 are depicted as having a circular cross-section, those skilled in the art will readily recognize the rods 150 may alternatively have a square, rectangular, hexagonal or any of a number of other possible cross-sections.

Figure 2:
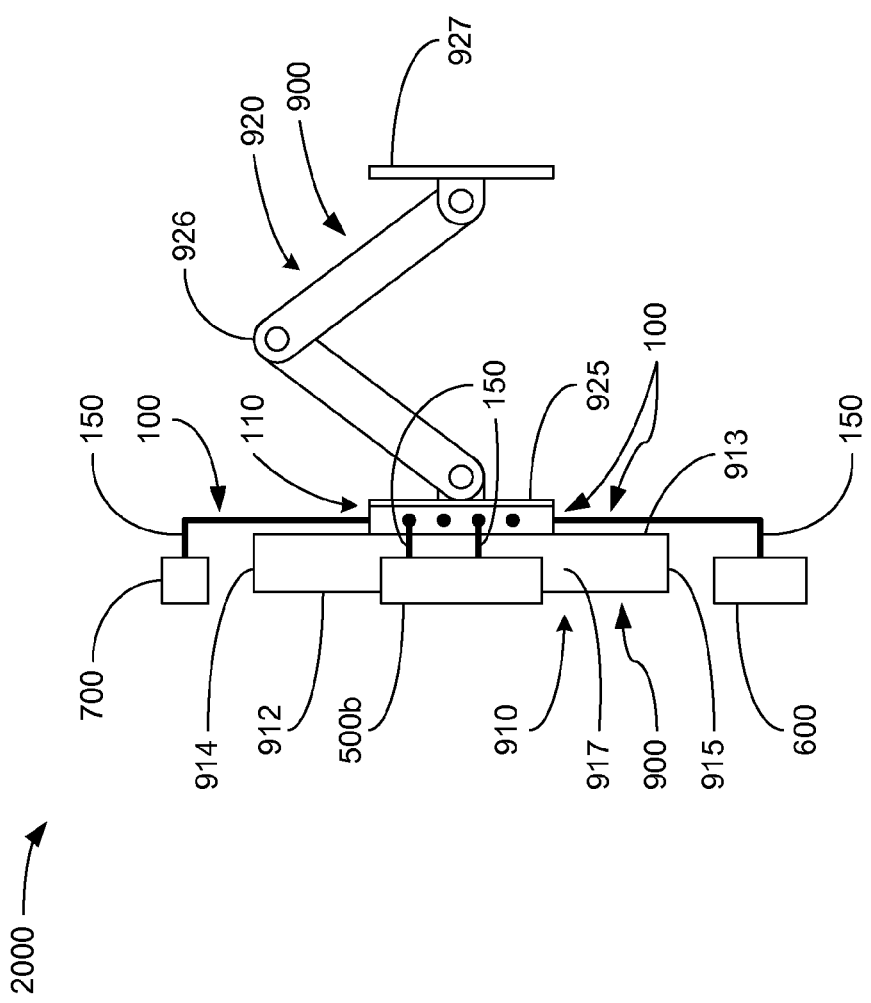
FIG. 2 is a side elevational view of another assembly.

FIG. 2 depicts another assembly 2000 of audio and video devices. Not unlike the assembly 1000 of FIGS. 1*a-d*, the assembly 2000 is capable of performing various multimedia functions, and also incorporates the bracket 100 to mount one or more of the audio devices 500*a*, 500*b*, 600 and 700 to a form of flat panel display 900. Much of what is depicted of the assembly 2000 in FIG. 2 is substantially similar to what is depicted of the assembly 1000 in FIGS. 1*a-d*, and therefore, corresponding items have been given identical numerical labels. However, a significant difference between the assemblies 1000 and 2000 is that while the support 920 of the assembly 1000 is describable as being a stand more conducive to supporting the panel 910 atop a horizontal flat surface (e.g., a desk or a table), the support 920 of the assembly 2000 is describable as being a flexible arm more conducive to affixing the panel 910 to a vertical surface (e.g., a wall). The support 920 of the assembly 2000 incorporates a mounting plate 925 that may be substantially similar to the mounting plate 925 of the assembly 1000, a flexible arm 926 incorporating one or more hinges, and another mounting plate 927. In another possible variation of the assembly 2000, the flexible arm 926 may be replaced with a either a shorter arm that incorporates no hinges or a detachable link (not shown) between the mounting plates 925 and 927.

Figure 3A:
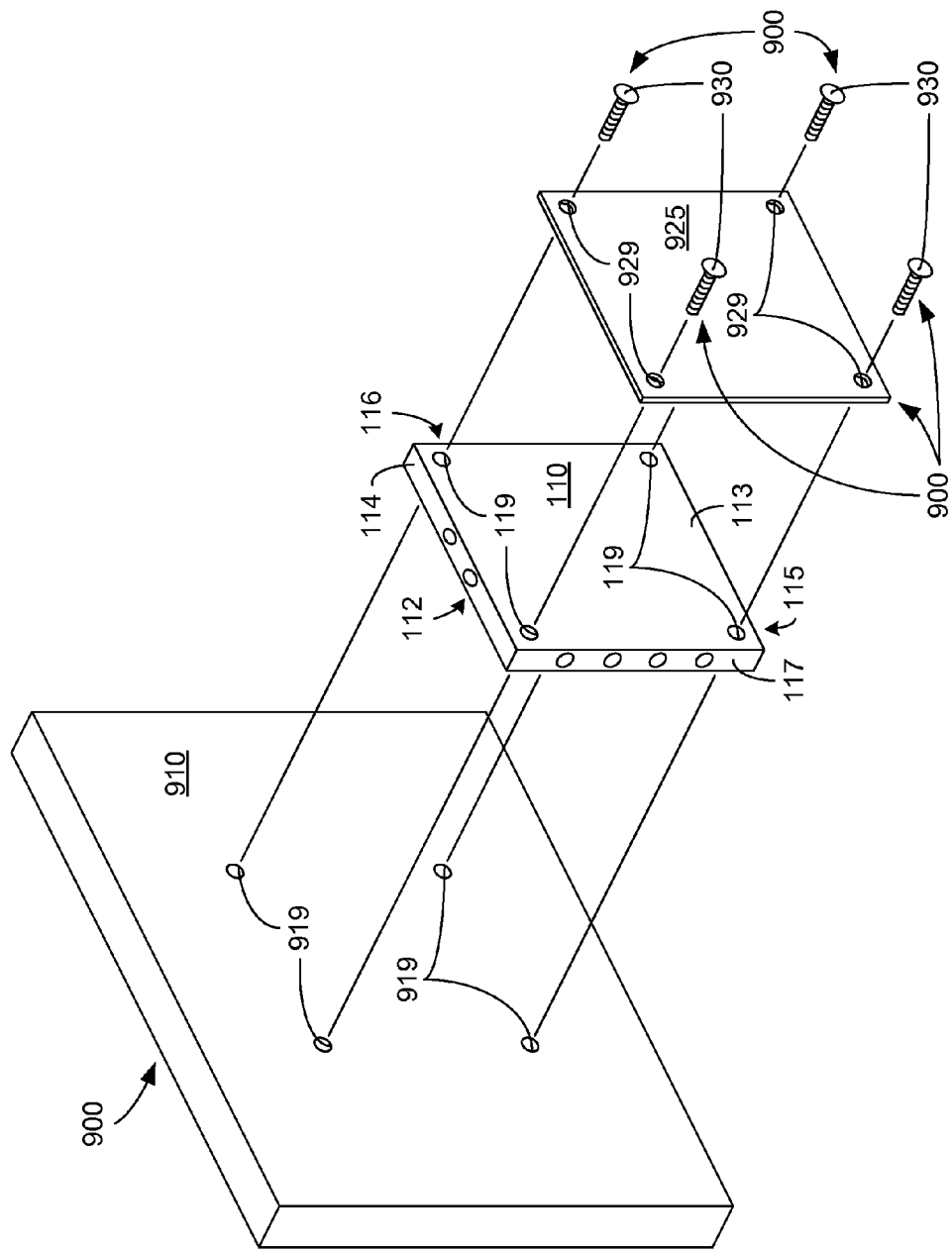
FIGS. 3a and 3b are exploded perspective views of portions of an assembly.
Figure 3B:
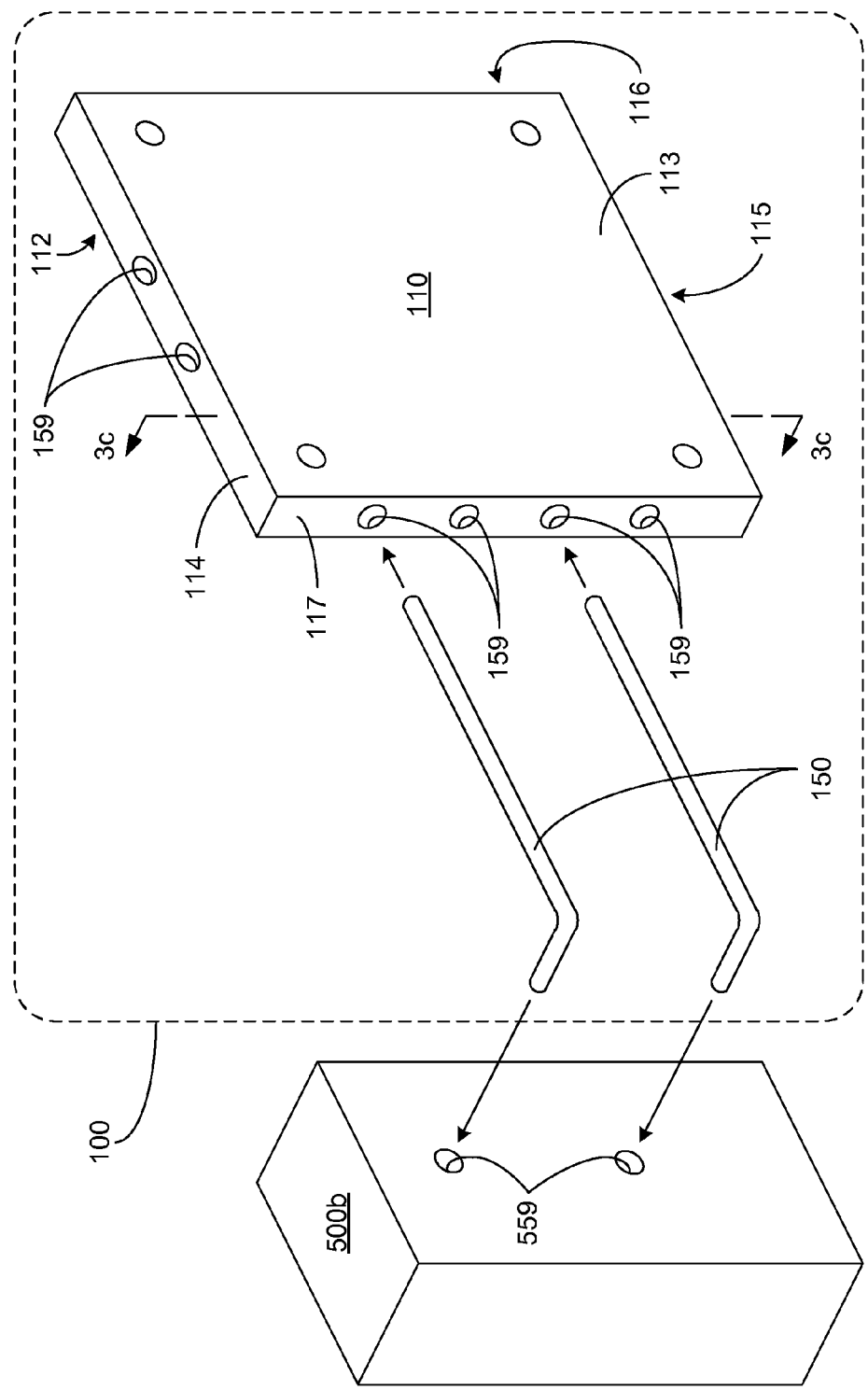
Figure 3C:
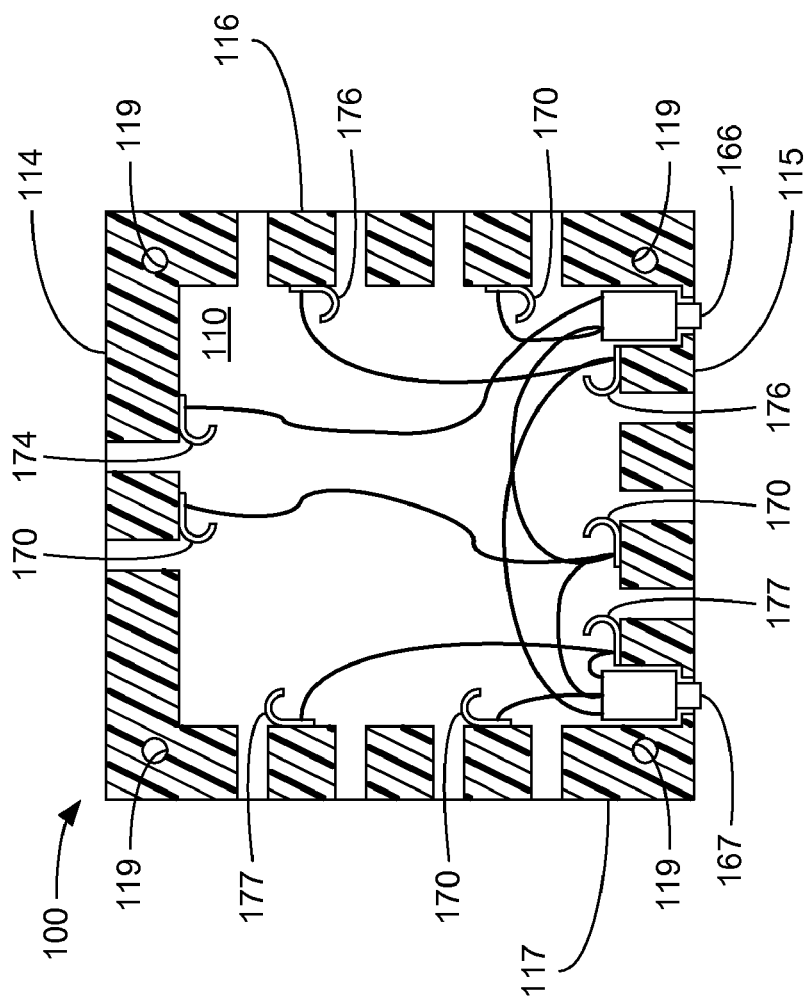
FIGS. 3c, 3d and 3e are sectional views of a hub depicted in FIGS. 3a and 3b.
Figure 3D:
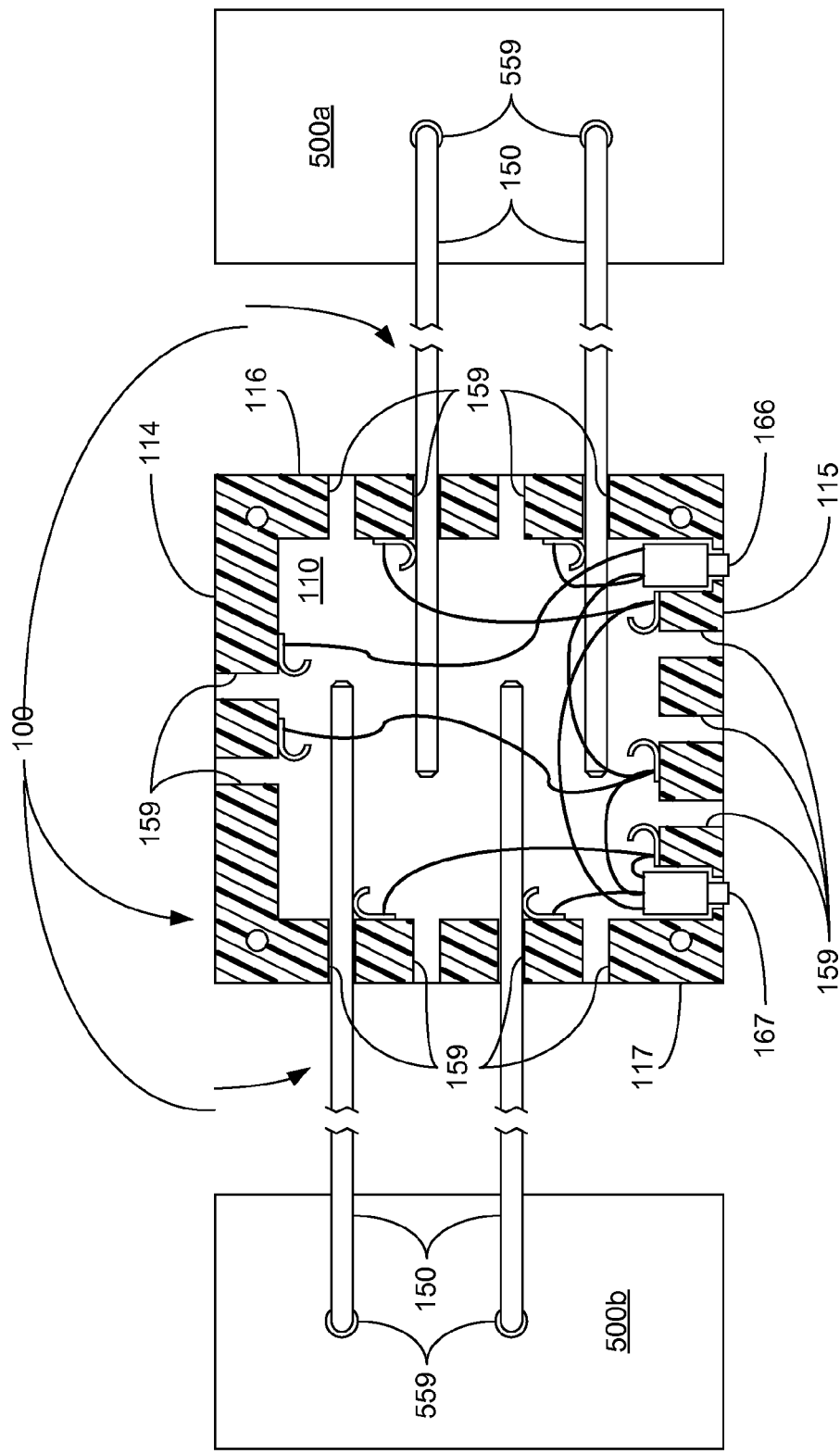
Figure 3E:
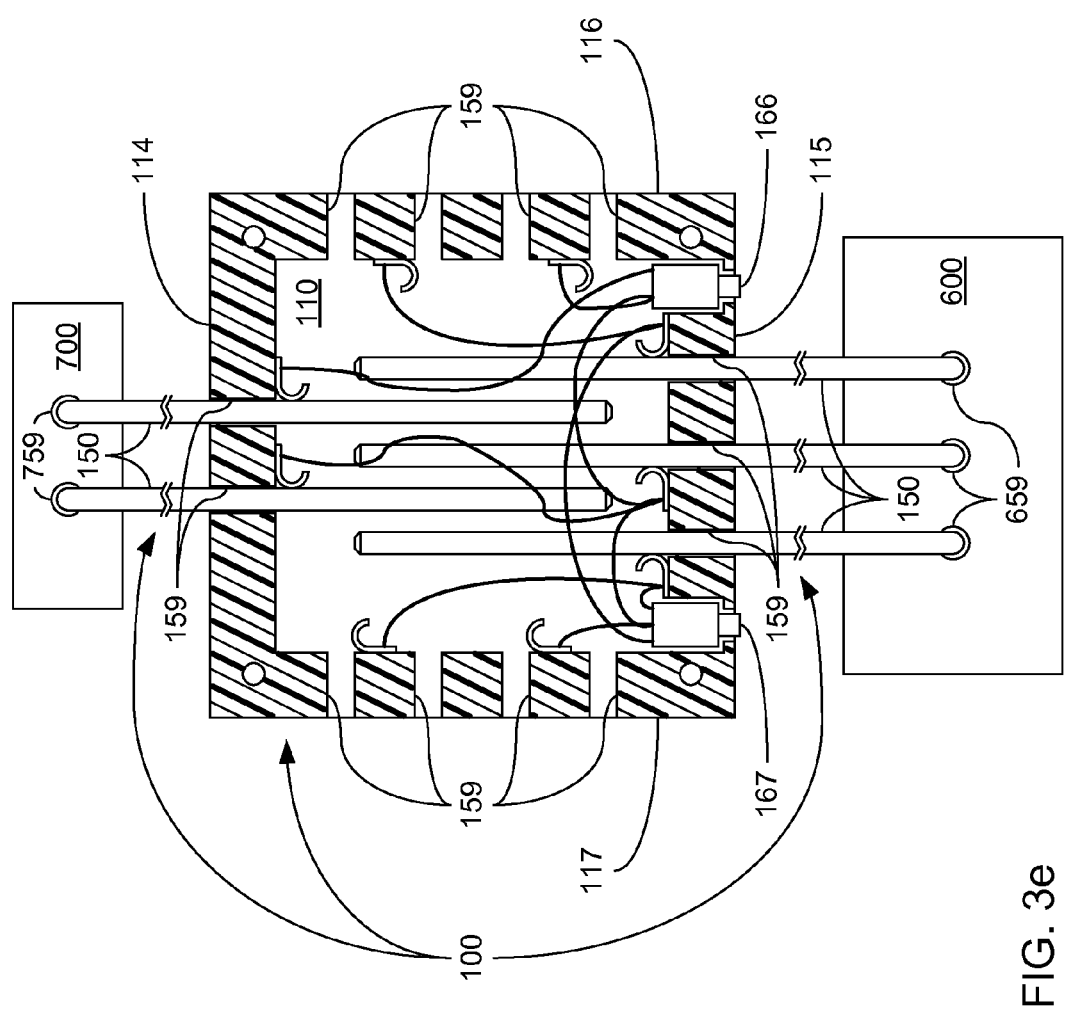

FIGS. 3*a*, 3*b*, 3*c*, 3*d* and 3*e*, taken together, more clearly depict the manner in which the hub 110 is shaped to support being mounted between the panel 910 and the mounting plate 925, and the manner in which audio devices are both physically and electrically coupled to the hub 110 via at least a pair of the rods 150 each. FIG. 3*a* more clearly depicts the manner in which the holes 919 of the panel 910, the passages 119 of the hub 110 and the passages 929 of the mounting plate 925 align to allow the mounting hardware 930 to both pass through the passages 929 and 119 and enter the holes 919 to mount the hub 110 in a sandwich configuration between the panel 910 and the mounting plate 925. FIG. 3*b* more clearly depicts the physical and electrical coupling of an audio device to the hub 110 (with the audio device 500*b* being selected to serve as the depicted example). FIGS. 3*c-e* are sectional views of one possible implementation of the hub 110 taken along the sectional line 3*c*-3*c* depicted in FIG. 3*b* such that a portion of the casing of the hub 110 that includes the rear face 113 is removed, while still leaving at least the edges 114, 115, 116 and 117 in view, to reveal interior features of the hub 110.

Turning to FIG. 3*a*, as previously discussed, a plurality of passages 119 are formed through the casing of the hub 110 for use in mounting the hub 110 to the flat panel display 900 by mounting the hub in between the panel 910 and the support 920. Four of the passages 119 by which the hub 110 is mounted between the panel 910 and the support 920 are positioned to form a rectangular pattern with each of four passages 119 positioned at a corner of that rectangle. As will be familiar to those skilled in the art, an industry standards organization known as the Video Electronics Standards Association (VESA®) of Milpitas, Calif., promulgates the Flat Display Mounting Interface Standard (FDMI™) which specifies a set of mechanical mounting configurations for use with flat panel displays. Early incarnations of this standard were meant to enhance manufacturing efficiencies for those producing supports for flat panel displays for computer systems, and became widely adopted by producers of those flat panel displays. However, over time, both early and more recent incarnations of this standard have also been widely adopted by producers of flat panel displays for home entertainment systems.

Of significance to the design of the bracket 100 are the specifications for mounting holes, their dimensions, and mounting hardware called for in the FDMI specification. For flat panel displays of 12" to 22.9" in diagonal measure and weighing up to 14 kg, an arrangement of four mounting holes in either a 75 mm×75 mm or 100 mm×100 mm square pattern is specified to be provided on a rear face of the casing of such displays in which the holes are threaded to receive 4 mm diameter machine screws. For flat panel displays of 23" to 30.9" in diagonal measure and weighing up to 23.7 kg, an arrangement of six mounting holes in a 100 mm×200 mm rectangular pattern is specified to be provided on a rear face of the casing of such displays in which the holes are again threaded to receive 4 mm diameter machine screws. Numerous other hole patterns and other mounting details for other sizes and weights of flat panel displays in various differing situations are also provided for in the FDMI specification, but are not detailed herein for the sake of simplicity of discussion.

Those involved in authoring the various incarnations of this standard were aware that producers of supports for flat panel monitors were likely to match the weight bearing capabilities of their supports to the size and configuration of the different hole patterns called for in the FDMI specification. In other words, flat panel displays having the 75 mm and 100 mm square hole mounting pattern would be presumed to be lighter than flat panel displays having the 100 mm×200 mm rectangular hole mounting pattern, and producers of supports would therefore design joints and other components of their supports in reliance on this presumption. Similarly, flat panel displays having the 100 mm×200 mm rectangular hole mounting pattern would be presumed to be lighter than flat panel displays having either a 200 mm×200 mm or a 200 mm×400 mm (or still larger) hole mounting pattern called for in the FDMI specification. However, those skilled in the art will readily recognize that despite these efforts made to rigidly specify which hole patterns are to be used with which sizes and weights of flat panel displays, there has been some tendency to make use of particular ones of the FDMI hole mounting patterns across a greater range of display sizes and weights than are strictly called for in the FDMI specification. By way of example, the 100 mm square hole pattern of four holes, which has over time become one of the most widely used, has been frequently employed even with displays up to 30" in diagonal measure and greater than 14 kg in weight.

In recognition of the above factors, the shape, size and configuration of at least one form of the hub 110 are preferably selected such that the passages 119 are arranged in a pattern matching the 100 mm×100 mm square hole pattern specified by FDMI for 12" to 22.9" diagonal measure displays to accommodate this very widely used hole pattern. Alternatively, the shape, size and configuration of at least one other form of the hub 110 are preferably selected such that the passages 119 are arranged in a pattern matching a 200 mm×200 mm square hole pattern useable with much larger displays. Also, in recognition of the above factors, the thickness of the casing of the hub 110 (i.e., the distance between the front face 112 and the rear face 113) is minimized to provide little more than the space needed to accommodate the attachment of the rods 150 to the hub 110 in order to minimize the additional torque exerted on the support 920 by the weight of the panel 910 as a result of the rear face 913 of the panel 910 being mounted forward and away from the mounting plate 925 of the support 920 as a result of the hub 110 being mounted therebetween.

Turning to FIGS. 3b-e, multiple passages 159 are formed in each of the edges 114, 115, 116 and 117 of the casing of the hub 110, each of the passages 159 being able to receive an end of one of the rods 150. Similarly, multiple passages 559 are formed in a portion of the casing of the audio device 500b, each also able to receive an end of one of the rods 150. Each one of the passages 159 and 559 is preferably dimensioned to support an end of one of the rods 150 with a snug slip-fit that tends to resist movement and tends to prevent rattling of the ends of the rods 150 within the passages 159 and 559. Although this snug slip-fit may enable a single one of the rods 150 to hold the audio device 500b stationary in a given position relative to the hub 110, it is preferred that a minimum of a pair of the rods 150 be employed in coupling the audio device 500b to the hub 110. By inserting opposite ends of each one of at least a pair of the rods 150 into corresponding ones of the passages 159 and 559, the audio device 500b is physically supported by the hub 110 in a manner that is sturdy enough to tend to prevent the audio device 500b from being rotated relative to the hub 110.

This snug slip-fit also affords considerable flexibility in positioning the audio device 500b relative to the hub 110. Specifically, there is flexibility in how far each of the ends of each of the rods 150 may be inserted into the passages 159 and 559. In this way, a range of sizes of the panel 910 having differing dimensions may be accommodated with a given length of the rods 150. Where the panel 910 is of relatively smaller height and width (i.e., the distances between opposing ones of the edges 914, 915, 916 and 917 are smaller), ends of one or more of the rods 150 may be inserted further into corresponding ones of the passages 159 to position one or more of the audio devices 500a, 500b, 600 and 700 closer to the hub 110 than where the panel 910 is of relatively larger width. Also, where the panel 910 is of relatively shallow depth from the front face 912 to the rear face 913, ends of one or more of the rods 150 may be inserted further into corresponding ones of the passages 559 of the audio device 500b (and their equivalent in the audio devices 500a, 600 and 700) than where the panel 910 is of relatively greater depth to better align one or more of the audio devices 500a, 500b, 600 and 700 with the front face 912 of the panel 910.

At least some of the passages 159 formed in one of the edges 114, 115, 116 and 117 of the casing of the hub 110 are aligned with at least some others of the passages 159 formed in an opposing one of the edges 114, 115, 116 and 117. More specifically, and as depicted more clearly in FIGS. 3c-e, four of the passages 159 formed in the left edge 116 of the casing of the hub 110 are aligned with four of the passages 159 formed in the right edge 117 of the casing of the hub 110. Such an alignment of at least some of the passages 159 allows still greater flexibility in how far ends of one or more of the rods 150 are inserted into these particular ones of the passages 159. Indeed, where an end of one of the rods 150 is inserted into one of an aligned pair of the passages 159, that end of that one of the rods 150 may be inserted all the way through the hub 110 such that it protrudes beyond the casing of the hub 110. In this way, a particularly small form of the panel 910 may be accommodated despite the use of rods 150 that are relatively lengthy.

Electrical contacts are positioned within the hub 110 adjacent to at least some of the passages 159 and 559 to physically engage at least one conductive surface of an end of one of the rods 150 inserted therein to form at least one electrical connection between the hub 110 and the audio device 500b. Within the hub 110 are ground contacts 170, speaker contacts 176 and 177, and a microphone contact 174 that are each associated with corresponding ones of the passages 159 formed in the casing of the hub 110, as shown, to each engage at least one conductive surface of an end of one of the rods 150 inserted therein to form an electrical connection therewith. Similarly, though not specifically shown, within the casing of the audio device 500b, at least one contact is also associated with at least one of the passages 559 to also physically engage at least one conductive surface of an end of one of the rods 150 inserted therein to also form an electrical connection therewith. In this way, electrical signals are conveyed between contacts within the hub 110 and contacts within the audio device 500b, thereby enabling electrical signals to be exchanged between the hub 110 and the audio device 500b when one or more of the rods 150 are employed in coupling the two of them. To aid conductivity between these contacts and conductive surfaces of the rods 150, one or more of these contacts and conductive surfaces may be fabricated and/or coated with materials having electrical characteristics chosen to provide enhanced electrical conductivity and/or to resist corrosion that would degrade electrical conductivity.

In this way, the audio device 500b is both supported by the flat panel display device 900 and electrically connected to an audio channel through hub 110 and the rods 150 of the bracket 100. Further, with the hub 110 sandwiched between the panel 910 and support 920, electrical connections to cables conveying audio signals are made in a manner that is more likely to be visually discrete.

The specific implementation of the hub 110 depicted in FIGS. 3c-e further incorporates a microphone jack 166 and a speaker jack 167. In some embodiments, the microphone jack 166 is a commonly available 3.5 mm 2-conductor female connector, and the speaker jack 167 is a commonly available 3.5 mm 3-conductor female connector. Ground conductors of both the microphone jack 166 and the speaker jack 167 are electrically connected by wires to the ground contacts 170. Also, the microphone conductor of the microphone jack 166 is electrically connected by a wire to the microphone contact 174. Further, left and right audio channel conductors of the speaker jack 167 are electrically connected by wires to the speaker contacts 176 and 177, respectively.

In this way a pair of the rods 150 may be inserted into two of the passages 159 formed in the left edge 116 of the casing of the hub 110 that correspond to a ground contact 170 and a speaker contact 176 to thereby enable the audio device 500a to be electrically connected to the ground and left audio channel conductors of the speaker jack 167. Similarly, a pair of the rods 150 may be inserted into two of the passages 159 formed in the right edge 117 of the casing of the hub 110 that correspond to a ground contact 170 and a speaker contact 177 to thereby enable the audio device 500b to be electrically connected to the ground and right audio channel conductors of the speaker jack 167. Additionally and/or alternatively, a triplet of the rods 150 may be inserted into three of the passages 159 formed in the bottom edge 115 of the casing of the hub 110 that correspond to a ground contact 170, a speaker contact 176 and a speaker contact 177 to thereby enable the audio device 600 to be electrically connected to the ground and both of the left and right audio channel conductors of the speaker jack 167. Additionally and/or alternatively, a pair of the rods 150 may be inserted into two of the passages 159 formed in the top edge 114 of the casing of the hub 110 that correspond to a ground contact 170 and the microphone contact 174 to thereby enable the audio device 700 to be electrically connected to the ground and microphone audio conductors of the microphone jack 166.

Also, in at least one preferred embodiment, the correspondence of various ones of the speaker contacts 176 and 177, along with accompanying ground contacts 170, with various ones of the passages 159 is such that rods 150 inserted to couple the hub 110 with the audio device 500a and the rods 150 inserted to couple the hub 110 with the audio device 500b do not physically interfere with each other within the hub 110. In support of this preferred embodiment, the passages 559 formed in each of the audio device 500a and 500b in this preferred embodiment are offset along at least one dimension of the casings of each of the audio devices 500a and 500b, as depicted in FIG. 3d. In this way, the physical construction of the audio devices 500a and 500b is enabled to be identical, at least insofar as the positioning of the passages 559, thereby possibly enabling a realization of cost benefits from the audio devices 500a and 500b having substantially identical design.

Further, in at least one preferred embodiment, the dimensions and configuration of corresponding electrical contacts for at least some of the passages 159 and/or the passages 559 are chosen to enable insertion of and electrical coupling of 4 mm plugs, otherwise commonly known as "banana" plugs. It is also preferred that in such an embodiment, at least some adjacent pairs of the passages 159 and/or the passages 559 are spaced on centers that accommodate paired "banana" plugs (e.g., pairs of 4 mm plugs having a common molded plastic surround) of the variety frequently used in conveying audio signals. In this way, an audio device may be coupled to the hub 110 via a cable employing such plugs as an alternative to the use of one or more of the rods 150.

As those skilled in the art will readily recognize, the specific arrangement and purposes of the electrical contacts depicted and just described is but one example of many possible arrangements and purposes of electrical contacts. Each of the edges 114, 115, 116 and 117 of the hub 110 may have differing quantities of the passages 159 formed therein, and differing quantities of contacts having any of a variety of possible purposes may be associated with any of those passages 159. Also, those skilled in the art will also readily recognize that the specific types, arrangement and purposes of the electrical connectors depicted and just described is but one example of many possible types, arrangements and purposes of electrical connectors. Fewer or greater quantities of connectors having the ability to conduct fewer or greater quantities of electrical signals may be employed in place of the 3.5 mm jacks discussed herein. Also, although no specific example of the conveying of electrical power is depicted and discussed herein, it will be readily recognize that one or more connectors and contacts may be employed in conveying power. Further, those skilled in the art will readily recognize that various forms of circuitry beyond mere interconnection of connectors and contacts may be carried within the hub 110, including audio amplification, volume control and/or still other forms of circuitry.

Also, those skilled in the art will readily recognize that the specific depiction of the structure and layout of components within the hub 110 are meant to provide but one example. The casing of the hub 110 may be fabricated in various ways with portions forming the edges 114, 115, 116 and 117 being any of a number of possible thicknesses. The passages 159, though depicted as each being formed through a single continuous piece of material to achieve the discussed snug slip fit, those skilled in the art will readily recognize that the passages 159 may be formed in any of a number of ways, including through the use of spaced-apart guides that perhaps incorporate elastic or spring-loaded components to engage the rods 150 to provide a slip fit that provides the previously discussed resistance to movement of the rods 150. The depicted wires interconnecting various ones of the electrical contacts, the microphone jack 166 and the speaker jack 167 are but one example of how such interconnections may be effected, and those skilled in the art will readily recognize that alternatives, such as a circuitboard incorporating conductive traces, may be employed.

Still further, as those skilled in the art will readily recognize, portions of the specific arrangement of electrical contacts and connectors just depicted and described may be employed without modification to serve purposes other than what has just been discussed. By way of example, although the microphone jack 166 and accompanying microphone contact 174 have been discussed as enabling the audio device 700 serving as a microphone to be electrically connected to a cable coupled to the microphone jack 166, this combination of connector and contact may also be employed in support of a different form of audio device 700 that serves an entirely different purpose, such as a center channel speaker or infrared sensor for a remote control system.

Figure 4:
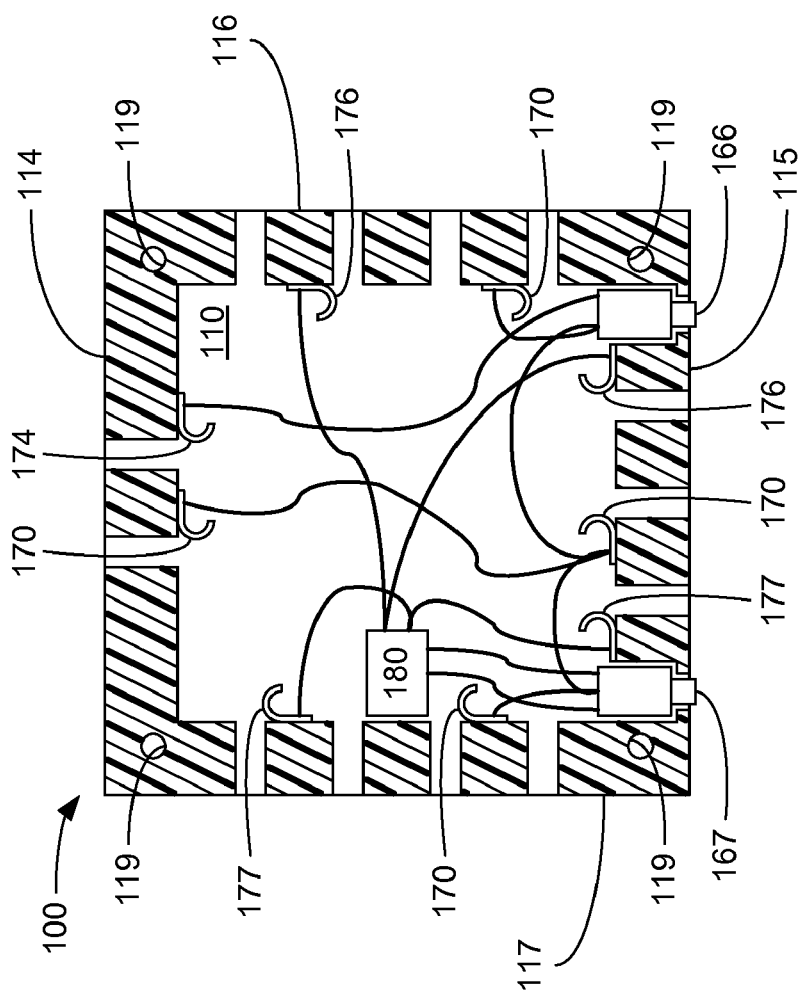
FIG. 4 is a sectional view of another hub.

FIG. 4 is a sectional view of an alternative implementation of the hub 110 also taken along the sectional line 3c-3c depicted in FIG. 3b such that a portion of the casing of the hub 110 that includes the rear face 113 is removed, while still leaving at least the edges 114, 115, 116 and 117 in view, to reveal interior features of this variant of the hub 110. The principal difference between the variant of the hub 110 depicted in FIG. 4 from the variant depicted in FIGS. 3a-e is in the electrical connections within the hub 110, including the addition of an orientation circuit 180 interposed between conductors of the speaker jack 167 and the speaker contacts 176 and 177. As is familiar to those skilled in the art, a subset of current-day flat panel displays are designed to be rotatable about an axis extending substantially perpendicularly through the front and rear faces 912 and 913 of the panel 910 such that a user of the flat panel display can turn the panel 910 a quarter turn clockwise or counterclockwise relative to the support 920 to switch between landscape and portrait viewing modes. This is commonly implemented through the use of a rotatable physical connection between the mounting plate 925 and other portions of the support 920.

The variant of the hub 110 depicted in FIG. 4 is meant to be mounted against the rear face 913 of the panel 910 so as to be rotated with the panel 910 when the user of the panel 910 changes between portrait and landscape modes. As a result, any audio device physically coupled to this variant of the hub 110 through one or more of the rods 150 will change orientation with the panel 910. By way of example, where the audio devices 500a and 500b are positioned along the left and right edges 916 and 917, respectively, of the panel 910 such that they are regarded as being in "left" and "right" positions in one orientation of the panel 910, the act of rotating the panel 910 between landscape and portrait modes may result in the audio devices 500a and 500b being moved such that they are regarded as being in "top" and "bottom" positions in another orientation of the panel 910. In this example, where the audio devices 500a and 500b incorporate acoustic drivers that output left and right audio channels, respectively, this change in orientation to "top" and "bottom" positions may render the separation of audio into left and right audio channels meaningless, and perhaps, audibly confusing to the user. In some embodiments, the orientation circuit 180 addresses this by sensing changes in orientation, mixing the left and right audio channels into a single channel and conveying the single channel to both of the audio devices 500a and 500b when the audio devices 500a and 500b have been moved from "left" and "right" positions to "top" and "bottom" positions. Possible implementations of the orientation circuit 180 may employ a combination of mercury switches and resistors to switch between maintaining the left and right audio channels as separate channels that are separately provided to the audio device 500a and 500b, and combining the left and right audio channels into a single channel that is provided to both of the audio devices 500a and 500b.

Figure 5A:
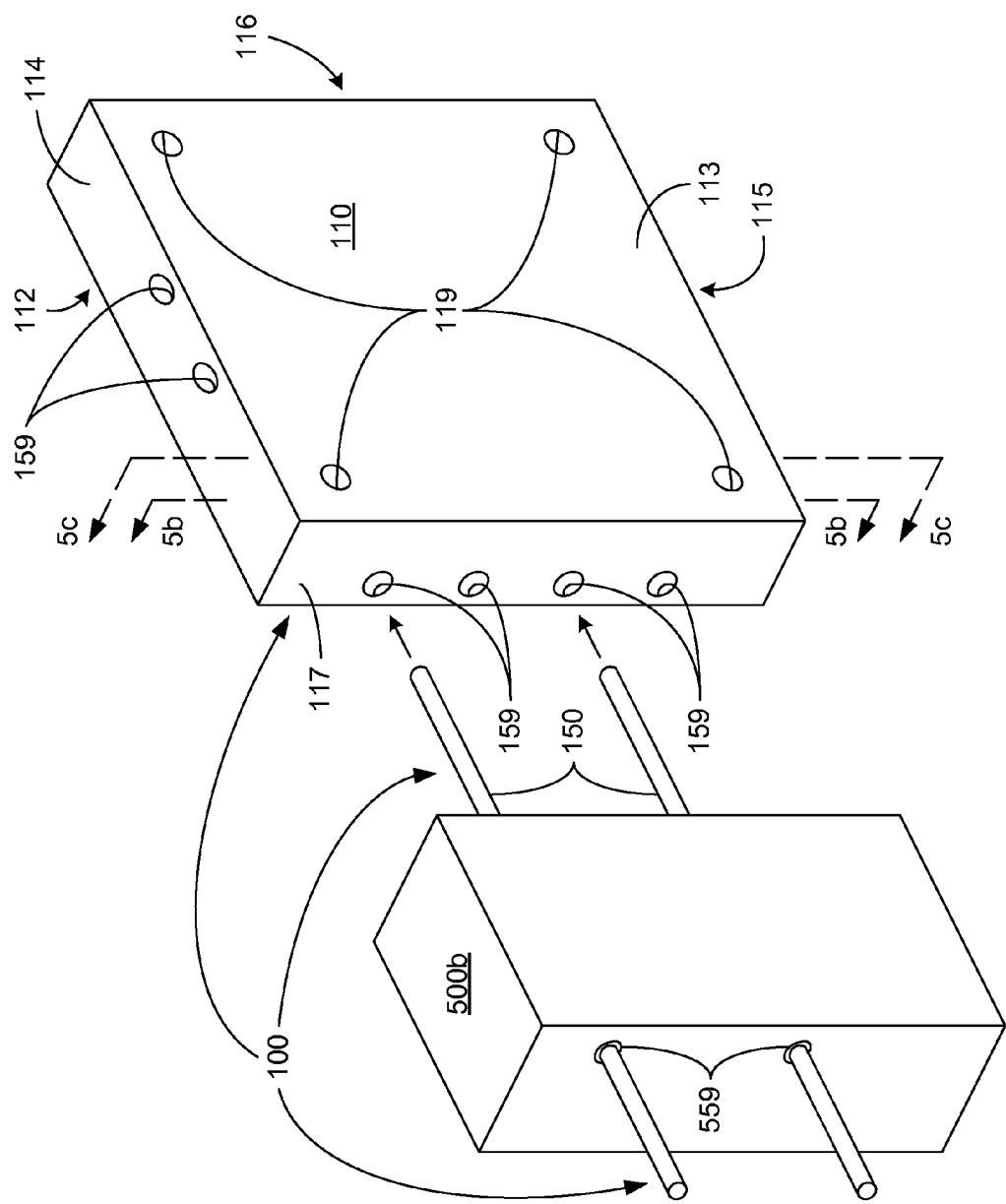
FIG. 5a is an exploded perspective view of portions of an assembly.
Figure 5B:
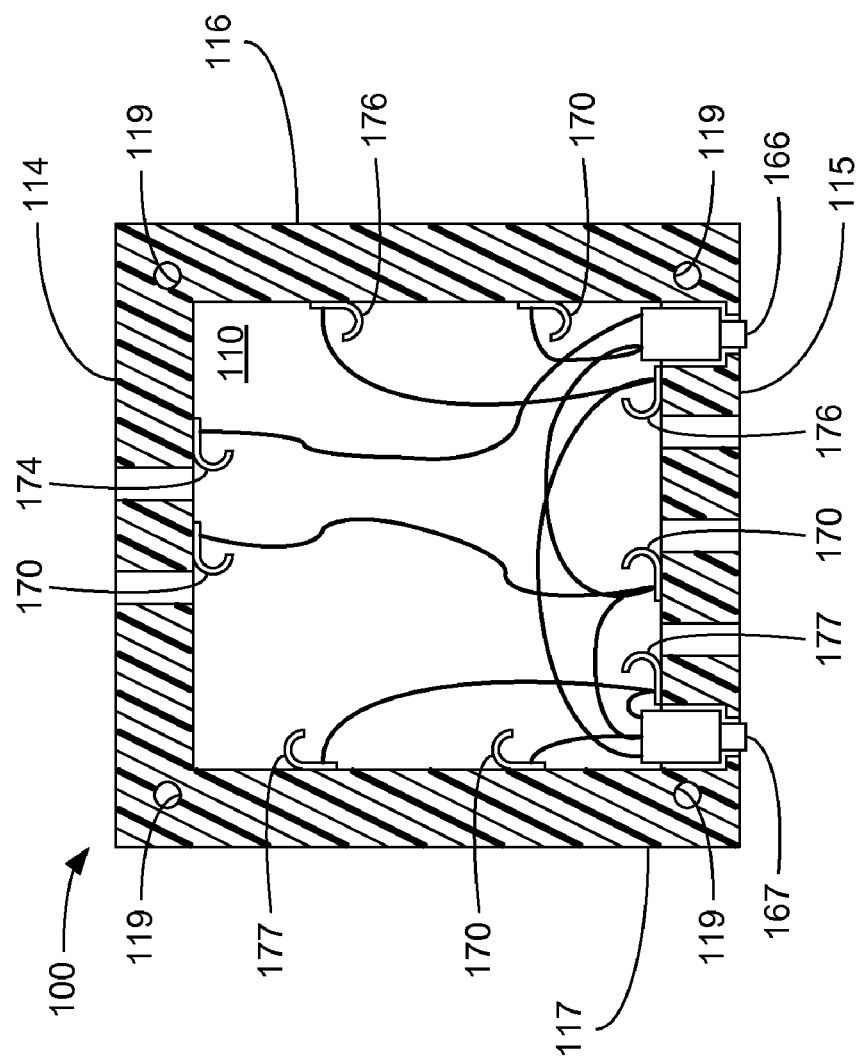
Figure 5C:
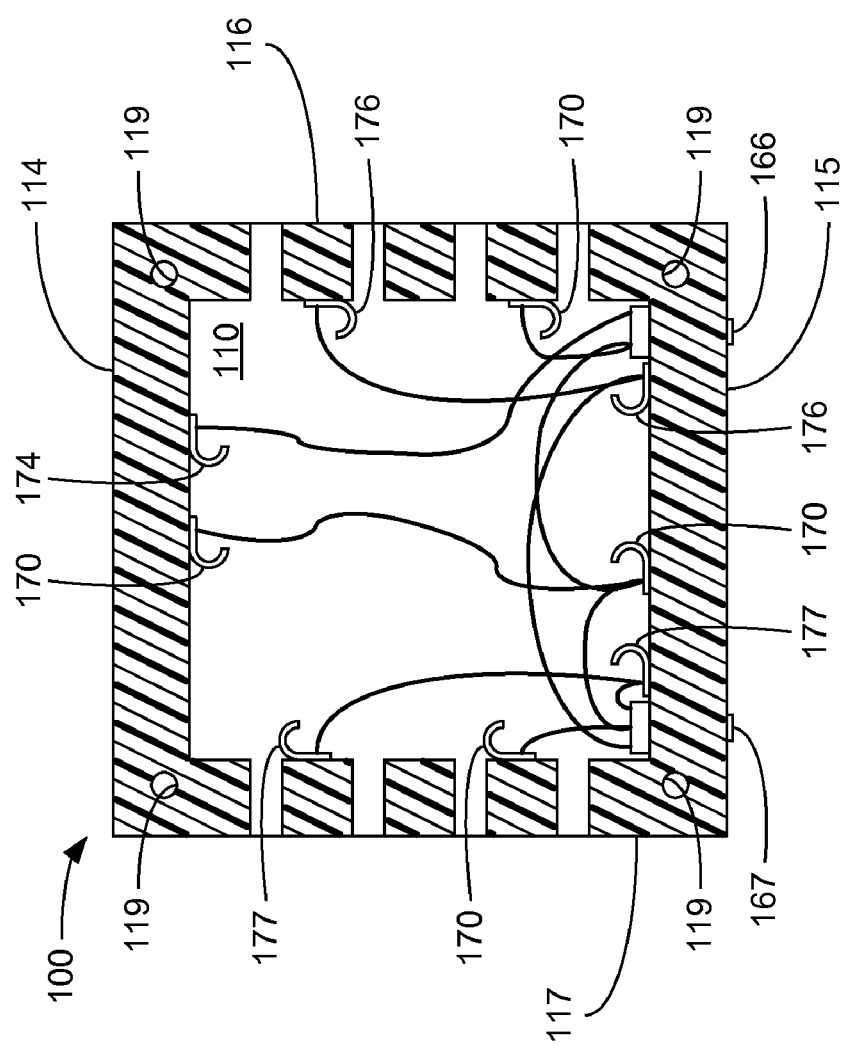
Figure 5D:
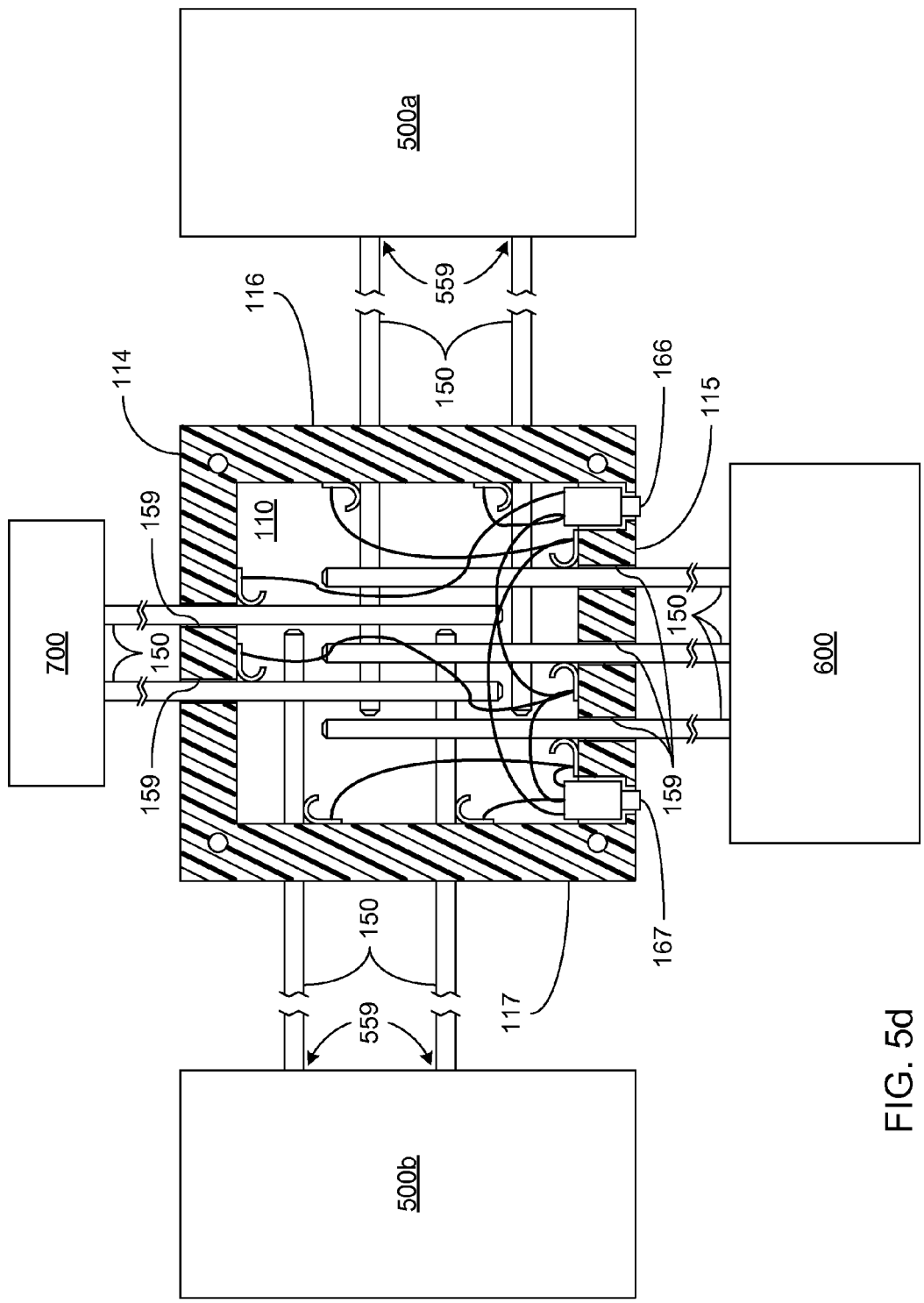

FIGS. 5a, 5b, 5c and 5d, taken together, more clearly depict the manner in which alternate forms of audio devices are both physically and electrically coupled to still another embodiment of the hub 110 and more clearly depict the manner in which this other embodiment of the hub 110 is shaped to support being mounted between the panel 910 and the support 920. FIGS. 5a-d also more clearly depict the manner in which an alternate form of the rods 150 couple an alternate form of audio device (with an alternate form of the audio device 500b being depicted solely as an example for purposes of this discussion) having passages to receive this alternate form of the rods 150 formed in an alternate portion of the casing. FIG. 5a more clearly depicts the physical and electrical coupling of this alternate form of the audio device 500b to this alternate embodiment of the hub 110. FIGS. 5b-d are sectional views of this alternate embodiment of the hub 110 revealing interior features. FIGS. 5b and 5d are sectional views taken along the sectional line 5b-5b depicted in FIG. 5a, and FIG. 5c is a sectional view taken along the sectional line 5c-5c depicted in FIG. 5a.

The principal difference between the hub 110 of FIGS. 3a-e and the hub 110 of FIGS. 5a-d is that all of the passages 159 of the hub 110 of FIGS. 3a-e have axes that are positioned on substantially the same plane, while the passages 159 of the hub 110 of FIGS. 5a-d have axes that are positioned on one or the other of two different but substantially parallel planes. Indeed, as can be seen more clearly in FIGS. 5b-d, the passages 159 formed in the top edge 114 and the bottom edge 115 of the hub 110 are positioned in a different plane from the passages 159 formed in the left edge 116 and the right edge 117. With the passages 159 so distributed among two different planes, interference between ones of the rods 150 inserted through ones of the passages 159 formed in the top edge 114 or the bottom edge 115 with ones of the rods 150 inserted through ones of the passages 159 formed in the left edge 116 or the right edge 117 is prevented. This affords some greater degree of flexibility in the use of hub 110 of the FIGS. 5a-d over the hub 110 of the FIGS. 3a-e.

Figure 6:
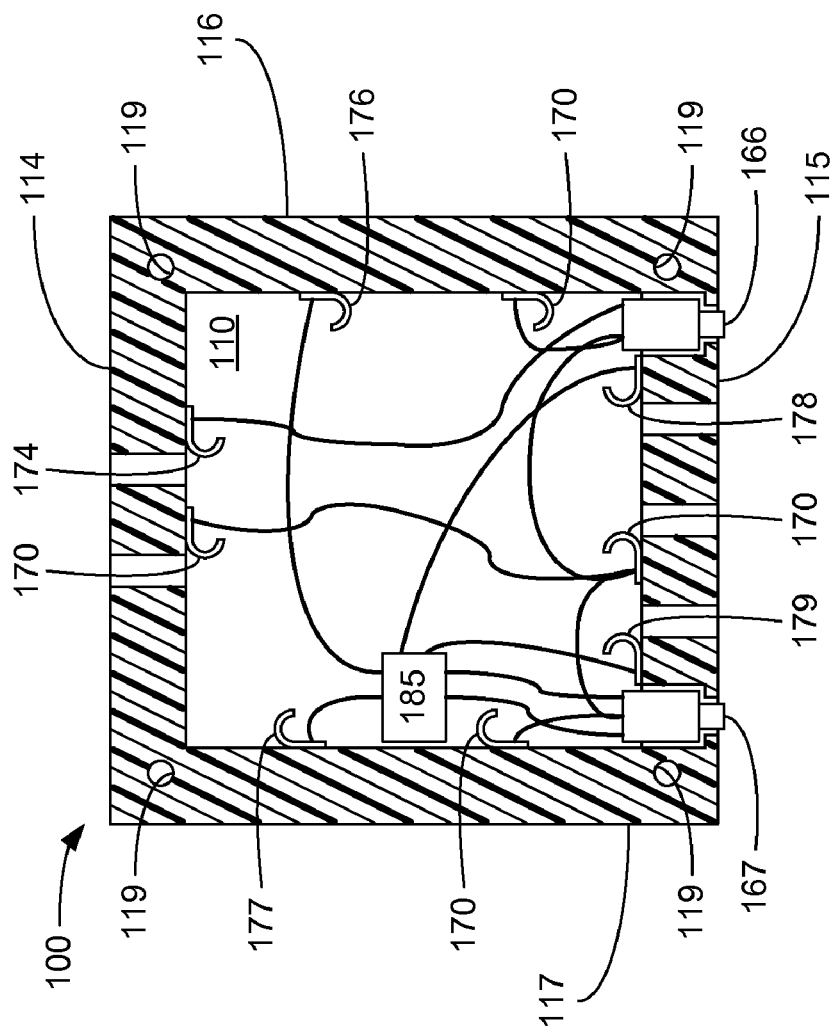
FIG. 6 is a sectional view of yet another hub.

FIG. 6 is a sectional view of yet another alternative implementation of the hub 110 also taken along the sectional line 5b-5b depicted in FIG. 5a such that a portion of the casing of the hub 110 that includes the rear face 113 is removed, while still leaving at least the edges 114, 115, 116 and 117 in view, to reveal interior features of this variant of the hub 110. A principal difference between the variant of the hub 110 depicted in FIG. 6 from the variant depicted in FIGS. 5a-d is in the electrical connections within the hub 110, including the addition of an audio control circuit 185 interposed between conductors of the speaker jack 167 and the speaker contacts 176 and 177 along the left edge 116 and the right edge 117, respectively. Another principal difference is the replacement of speaker contacts 176 and 177 along the bottom edge 115 with control contacts 178 and 179 that are also electrically coupled to the audio control circuit 185.

The placement of the control contacts 178 and 179 along the bottom edge 115 enables a variant of the audio device 600 providing one or more manually operable controls to be electrically coupled to the audio control circuit 185 through one or more of the rods 150 that couple this variant of the audio device 600 to the hub 110. The manually operable controls may enable user control of one or more aspects of audio functions performed by one or more of the audio devices 500a, 500b and 700, including and not limited to, volume, amplification gain, audio channel mixing, frequency adjustment and muting. By way of example, this variant of the audio device 600 may provide a manually operable volume control to enable user control of the volume with which audio is possibly output by forms of the audio devices 500a and 500b that have acoustic drivers for audibly outputting sound.

Figure 7:
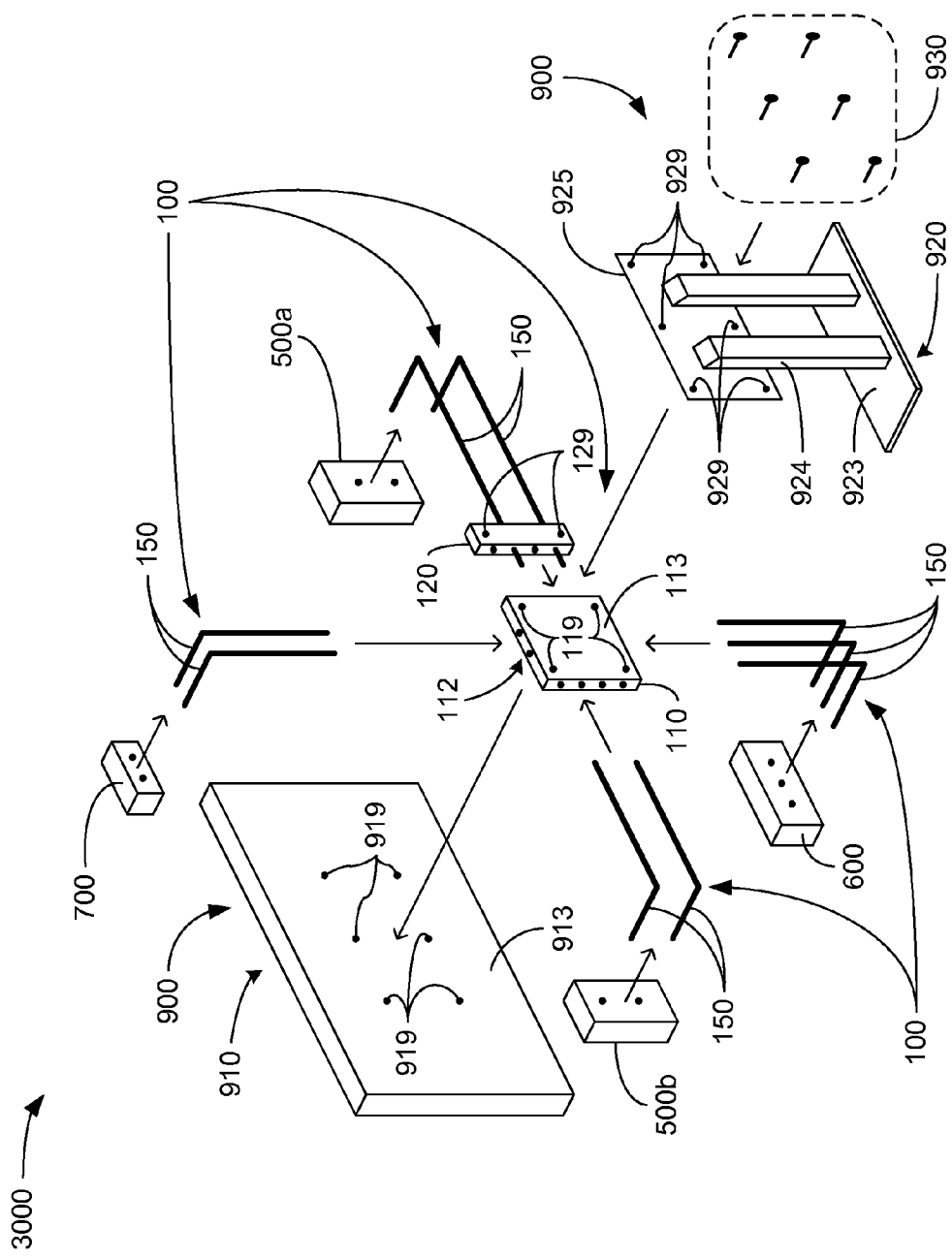
FIG. 7 is an exploded perspective view of still another assembly.

FIG. 7 depicts still another assembly 3000 of audio and video devices. Not unlike the assembly 1000 of FIGS. 1a-d and the assembly 2000 of FIG. 2, the assembly 3000 is capable of performing various multimedia functions, and also incorporates the bracket 100 to mount one or more of the audio devices 500a, 500b, 600 and 700 to a form of flat panel display 900. Much of what is depicted of the assembly 3000 in FIG. 7 is substantially similar to what is depicted of the assembly 1000 in FIGS. 1a-d and the assembly 2000 in FIG. 2, and therefore, corresponding items have been given identical numerical labels. However, a significant difference between the assembly 3000 and both of the assemblies 1000 and 2000 is that while the hub 110 in each of the assemblies 1000 and 2000 was relied upon to provide the four passages 119 required to enable the hub 110 to be mounted in between the panel 910 and the support 920 where variants of FDMI hole mounting patterns employing four holes are used, the hub 110 of the assembly 3000 is accompanied by a brace 120 to provide two additional passages 129 that cooperate with four of the passages 119 of the hub 110 to mount the hub 110 between the panel 910 and the support 920 where a variant of a FDMI hole mounting pattern employing six holes is used.

In addition to providing the two additional passages 129 by which the brace 120 is mounted alongside the hub 110, the brace 120 also provides passages that are aligned with some of the passages 159 formed in one of the edges 114, 115, 116 and 117 when the brace 120 is mounted alongside the hub 110. This alignment of passages enables one or more of the rods 150 to be inserted therethrough the brace 120 and into the hub 110. In this way, relatively lengthy forms of the rods 150 are further stiffened when extending for a lengthier distance from the hub 110 to reach an edge of a larger form of the panel 910.

FIG. 8 depicts another portion of an assembly to exemplify a form of a looping rod 155 having a pair of ends able to be inserted into passages 159 of the hub 110 alongside one or more of the rods 150. The looping rod 155 is configured to not convey an electrical signal from a surface of one end of the looping rod 155 that may encounter one of the electrical contacts within the hub 110 to a surface of another end of the looping rod 155 that also may encounter one of those electrical contacts. In this way, the looping rod 155 is rendered incapable of causing a short circuit upon coupling to the hub 110. The generally U-shaped configuration of looping rod 155 may incorporate a bend or curve to allow the looping rod 155 to straddle around one of the rods 150 such that a portion of the looping rod 155 is out of the plane defined by the pair of ends of the looping rod 155, as depicted. The generally U-shaped configuration of the looping rod 155 may be employed as an aid in routing one or more cables and/or as a graspable handle.

Other implementations are within the scope of the following claims and other claims to which the applicant may be entitled.

What is claimed is:

1. A method comprising:

detecting a rotation of a panel of a flat panel display between a landscape mode and a portrait mode; and switching between a first mode and a second mode in response to detecting the rotation, wherein a first audio channel is directed to a first audio device physically supported along a first edge of the panel and a second audio channel is directed to a second audio device physically supported along a second edge of the panel in the first mode, and wherein the first and second audio channels are mixed into one mixed audio channel and the one mixed audio channel is directed to first and second audio devices in the second mode.

2. The method of claim 1, wherein the first edge and the second edge are opposite edges of the panel.

3. The method of claim 1, further comprising enabling the first audio device to be physically supported along the first edge and the second audio device to be physically supported along the second edge with an audio device bracket configured to be mounted to a rear face of the panel such that the first audio device and the second audio device rotate with the panel during rotation of the panel between portrait and landscape modes.

4. The method of claim 3, wherein the audio device bracket is configured to be mounted between the rear face of the panel and support of the flat panel display.

* * * * *